Oct. 17, 1950     C. JOHNSON     2,526,361
CONTROL VALVE FOR FLUID SERVOMOTORS
Original Filed March 2, 1944
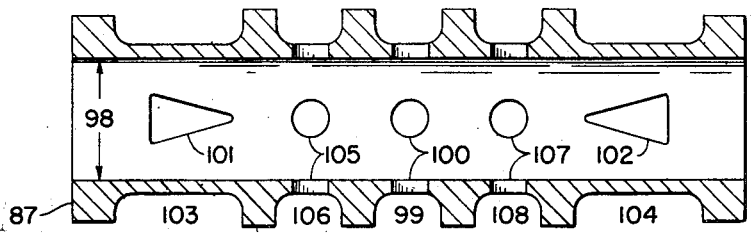
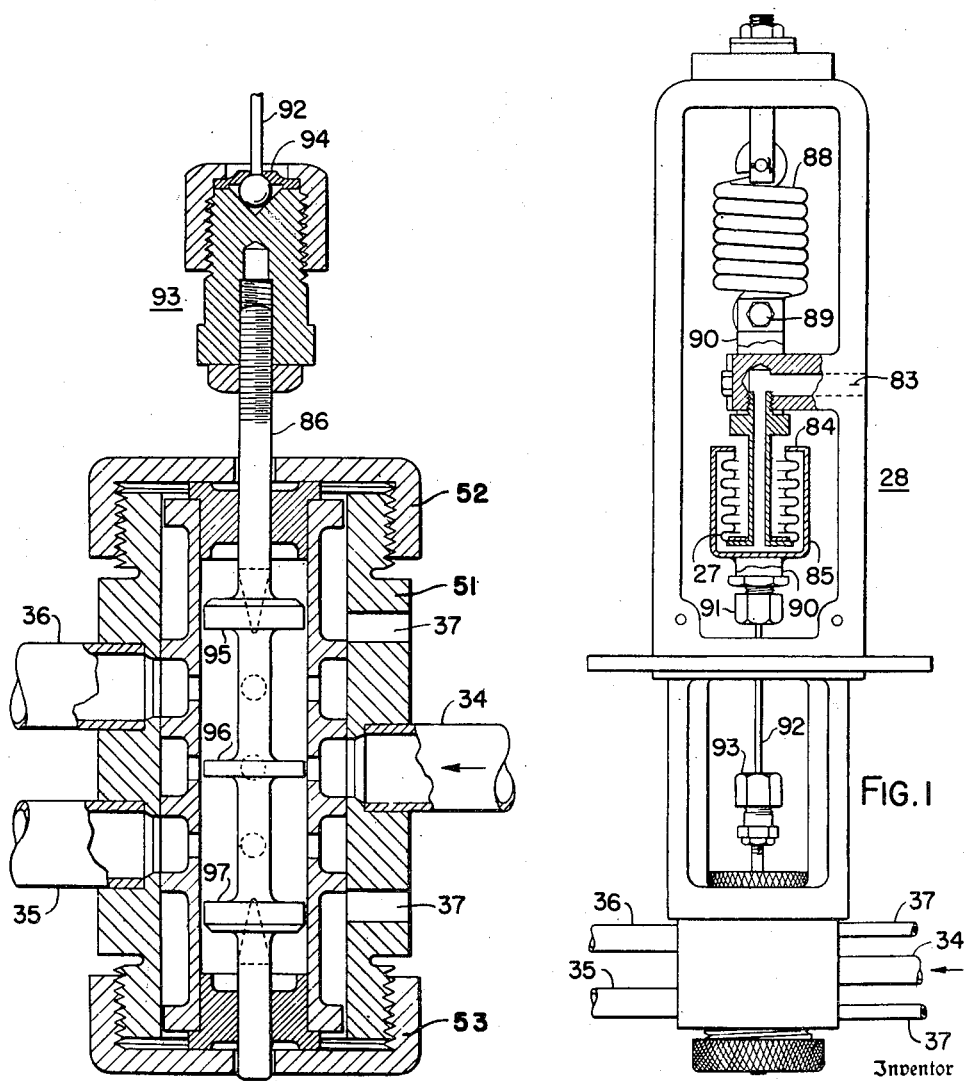
Inventor
CLARENCE JOHNSON
By Raymond W. Junkins
Attorney

UNITED STATES PATENT OFFICE 2,526,361

CONTROL VALVE FOR FLUID SERVOMOTORS

Clarence Johnson, South Euclid, Ohio, assignor to Bailey Meter Company, a corporation of Delaware Original application March 2, 1944, Serial No. 524,707, now Patent No. 2,475,326, dated July 5, 1949. Divided and this application May 29, 1946, Serial No. 672,992

4 Claims. (Cl. 121—46.5)

This invention relates in general to fluid control valves and more especially to fluid pilot valves for use with fluid servo-motors.

An object of the invention is to provide a fluid pilot valve to direct fluid to one end or the other of the cylinder of a fluid servo-motor.

A further object of the invention is to construct such a fluid pilot valve which has a minimum of friction and which has a minute continuous fluid leakage therein to prevent a build up of pressure on one side of the piston of the fluid servo-motor relative to the other.

A still further object of the invention is to provide a fluid pilot valve which is very easily reciprocably positioned and which has no undesirable end reaction or tendency for axial displacement.

A still further object of the invention is to provide a fluid pilot valve which may be easily axially positioned by a low powered air pressure system wherein the pilot valve and associated fluid servo-motor create no self-energizing axial movement to cause a load on the low powered air pressure system.

The fluid pilot valve of the invention may be used with any fluid servo-motor and is preferably adapted for use with contour control systems for use with material forming machines such as may be found in my parent Patent No. 2,372,426.

In the drawing:

Fig. 1 is a front elevation, partly in section, of a pilot valve assembly of the invention;

Fig. 2 is an enlarged sectional elevation of the pilot valve of Fig. 1; and

Fig. 3 is a sectional view of the stationary pilot valve sleeve of Fig. 2.

The fluid pilot valve will be described in conjunction with an assembly which includes a low pressure air system for positioning the movable portion of the pilot valve. Such a low pressure air system is often found on contour control systems of material forming machines wherein an air tracer obtains intelligence from a pattern or template and the variations of air pressure obtain in the air tracer are used to axially position a bellows with such bellows positioning the movable member of the fluid pilot valve. The fluid pilot valve may then direct fluid to one end or the other of a cylinder of a fluid servo-motor which is the power means for moving a machine element of the material forming machine to cause such machine element to follow the dictates of the pattern.

In Figure 1, I show an elevation, partly in section, of the complete assembly 28 to approximately one-half scale. In Fig. 2 I show to approximately full scale a sectional elevation of the relay valve itself, and in Fig. 3 a sectional view of the pilot valve sleeve to still larger scale.

Air pressure, as determined by the tracer assembly, is available through the pipe 83 and effective upon the bellows 27 for positioning the free end 84 therefor as well as the movable containing cup 85. Positioned by the bellows 27 is a relay valve member 86 relative to a stationary sleeve member 87. The sleeve 87 is mounted within a housing 51, and may be axially positioned therein by the threaded end caps 52 and 53. Loading the bellows, or opposing movement of the bellows and the valve member 86, is a spring 88 adjustably supported at one end and pivotally fastened at its movable end, as at 89, to one end of a yoke 90 straddling the air inlet pipe 83 and bellows containing cup 85. At its lower end the yoke 90 is fastened to the bellows containing cup 85, and is also attached to the upper ball joint 91. The relay valve member 86 is positioned by a wire or small rod connection 92 joining the upper ball joint 91 with a lower ball joint 93, the latter of which is adjustably connected to the relay valve member 86.

Due to the design of the valve member 86, it is positionable with substantially no friction or end thrust reaction, and thus imposes substantially no load upon the positioning rod 92. The driving construction including the ball joints 91, 93 and rod 92 minimized the effect of any slight misalignment of the parts or distorted movement of the power unit comprising the spring 88, the yoke 90, bellows 27 and the containing cup 85. The construction of the ball joint 93 is clearly shown in Fig. 2 wherein the ball retaining cap 94 may be of metal for example and may be lubricated. The ball joint 91 is of similar construction. Obviously, the compression of the cap 94 upon the ball may be readily adjusted.

The movable valve member 86 is provided with three spaced lands 95, 96 and 97 and is positionable within the bore 98 of the stationary sleeve 87. In my preferred construction the upper and lower lands 95, 97 have a diameter allowing a total clearance of approximately .001 inch with the bore 98, while the middle land 96 may have slightly less clearance with the bore 98.

Oil under pressure is available through the pipe 34 in an annular chamber 99 (see Fig. 3) surrounding the sleeve 87 at the location of the land 96 and communicating with the bore 98 through a plurality (in this example four) of openings 100. The width of the land 96 is preferably about .002 inch less than the diameter of the holes 100 so that when the member 86 is in its neutral position, with the land 96 centered on the holes 100, there may be a very slight bleed of oil from the annular chamber 99 through the holes 100 to either side of the land 96 within the bore 98.

In the preferred embodiment, the sleeve 87 has two drainage openings 101 and two drainage openings 102, each of roughly triangular shape. The number and shape of these openings may vary for different conditions. They communicate respectively with annular chambers 103, 104, which drain to the sump through pipe or pipes 37.

With the member 86 in neutral position the lands 95, 97 are so spaced relative to drainage openings 101, 102 that the tip of each such opening is uncovered by approximately .002 inch providing thereby a continuous small bleed of oil from the interior of the bore 98 between the lands 95, 96 and between the lands 96, 97.

Intermediate the lands 95, 96 in the sleeve 87 are a plurality of openings 105 communicating with an annular chamber 106 to which is joined the pipe 36 leading to one end of the cylinder of the servo-motor. Intermediate the lands 96, 97 in the sleeve 87 are a plurality of openings 107 communicating with an annular chamber 108, which is joined by the pipe 35 leading to the other end of the cylinder of the servo-motor.

The operation is as follows:

1. With the valve member 86 in what I term a neutral position (for cylindrical turning) the piston of the servo-motor is locked by equal oil pressures on opposite sides thereof against movement. A minute constant flow of oil (from the supply pipe 34) passes through the chamber 99 and holes 100 to either side of the land 96 which is positioned centrally of the holes 100. At the same time an equal minute bleed of oil under pressure takes place through the discharge openings 101, 102 to the annular chambers 103, 104, and the pipes 37 to the sump. Thus the system comprising the supply pipe 34, the space within the bore 98 between the lands 95, 96, the space within the bore 98 between the lands 96, 97, pipes 35, 36 and the two ends of the cylinder of the servo-motor are all maintained under an active uniform fluid pressure with no possibility for pressure build-up at one side of the piston of the servo-motor relative to the other side, or vice versa. I have found it highly desirable to provide (at neutral position of the valve member 86) such continuous minute passage of oil from the supply 34 through the pilot assembly to drain 37 to insure full equalization of pressure in all parts of the system.

2. When, upon change in pressure effective upon the bellows 27, the valve member 86 is moved upwardly, the land 96 forms an obstruction between the openings 100 and the openings 105, and the land 95 further opens the drainage holes 101 to allow a bleed of fluid from the pipe 36 to the drain 37. At the same time the land 96 increases the opening through the holes 100 to the openings 107 to allow a greater intake of pressure fluid from the chamber 99 through the openings 107 to the chamber 108 and pipe 35. In the meantime the land 97 has moved to obstruct drainage to the lower discharge opening 102. The degree of upward movement of the valve 86 determines the percentage opening of the holes and thus the speed of travel of the piston of the servo-motor.

3. Conversely, upon the valve 86 being moved downwardly, connections to the drain openings 101 are closed, the drains 102 are opened and fluid under pressure from the supply 34 is admitted to the pipe 36 and drained to the pipe 37 from the pipe 35.

Axial location of the sleeve 87 relative to the pipes 34, 35 and 36 is readily apparent from the drawing Fig. 2. Axial adjustment of the valve member 86 relative to the sleeve 87 for any given loading condition of pressure within the bellows 27 and loading of the spring 88 is accomplished by the adjustable connection to the ball joint 91 or 93.

This application is a division of my application Serial No. 524,707, filed March 2, 1944, now Patent No 2,475,326.

While I have illustrated and described certain preferred embodiments of my invention it will be understood that they are by way of example only and that I am not to be limited thereto except as defined in the following claims.

What I claim as new, and desire to secure by Letters Patent of the United States, is:

1. A hydraulic pilot valve comprising a housing, a sleeve body axially movable in the housing, a cylindrical chamber in the sleeve body having two spaced outlet ports, an inlet port located between said outlet ports, and a waste port located beyond each of said outlet ports, a movable valve member located axially in said chamber and journaled in fluid sealing manner in the ends of the pilot valve, said valve member provided with three spaced lands closely fitting the bore of the cylindrical chamber and spaced in general agreement with the inlet and two outlet ports, each of said lands having a diameter slightly less than the diameter of said cylindrical chamber to permit a minute fluid leakage therebetween, the center land being of an axial dimension slightly less than the inlet port so that there normally exists a minute fluid pressure flow from said inlet port past said center land to each of said waste ports, the two outermost lands having an axial dimension less than the waste ports to permit fluid communication between the waste ports and the portions of the cylindrical chamber outboard of the two outermost lands, the two outermost lands spaced a slightly greater amount than the minimum distance between the waste ports thereby normally allowing a slight fluid bleed to waste through each of said waste ports, whereby when the movable valve member is in neutral position the continuous fluid pressure feed from the inlet port to the two outlet ports and the continuous fluid pressure bleed to waste prevents the possibility of a build-up of pressure in one outlet port relative to the other, said housing having threaded end portions, end caps threadedly engaging said threaded end portions and adapted to engage said sleeve body to thus effect longitudinal adjustment of said sleeve body relative to said housing.

2. A fluid pressure directing valve comprising a hollow housing with a sleeve body axially movable therein, said sleeve body having a wall defining a chamber therein, an inlet port in said sleeve body wall to direct fluid into said chamber, a first waste port in said sleeve body wall spaced in a first direction from said inlet port, a second waste port in said sleeve body wall spaced in a second direction from the said inlet port, a valve member in said chamber reciprocably movable from a neutral position to a first and a second operating position, said valve member having a first land portion at one end thereof, a second land portion at the other end thereof, and a third land portion intermediate said first and second land portions, said first and third land portions in combination with the body wall defining a first compartment and said second and third land portions in combination with the body wall defining a second compartment, each of said land portions having a transverse dimension slightly less than the transverse dimension of said chamber to permit a minute fluid leakage therebetween, said third land portion having an axial dimension less than the axial dimension of the inlet port, said first and second land portions having an axial dimension less than the waste ports to permit fluid communication between the waste ports and the portions of the chamber outboard of the first and second land portions, said first and second land portions being spaced from each other a distance greater than the distance between the waste ports, whereby in the neutral position of said valve member the first and second compartments are in communication with the first and second waste ports respectively, a first outlet port in said body wall communicating with said first compartment and a second outlet port in said body wall communicating with said second compartment, said third land portion and said inlet port having wall means disposed relative to each other in said neutral position to define fluid passages to both said compartments, said third land portion and said inlet port having wall means disposed relative to each other in said first operating position to define a fluid passage from said inlet port to said first compartment and to obstruct fluid communication to said second compartment, and said third land portion and said inlet port having wall means disposed relative to each other in said second operating position to define a fluid passage to said second compartment and to obstruct fluid communication to said first compartment.

3. A fluid pressure directing valve comprising a hollow housing with a sleeve body axially movable therein, said sleeve body having a cylindrical wall defining a chamber therein, an inlet port in said sleeve body wall to direct fluid into said chamber, a first waste port in said sleeve body wall spaced in a first direction from said inlet port, a second waste port in said sleeve body wall spaced in a second direction from the said inlet port, a valve member in said chamber reciprocably movable from a neutral position to a first and second operating position, said valve member having a first cylindrical land portion at one end thereof having a cross section smaller than the cylindrical chamber to provide a bleed passage therebetween, a second cylindrical land portion at the other end thereof having a cross section smaller than the cylindrical chamber to provide a bleed passage therebetween, and a third cylindrical land portion intermediate said first and second land portions in combination with the body wall defining a second compartment, said first and second land portions having an axial dimension less than the waste ports to permit fluid communication between the waste ports and the portions of the cylindrical chamber outboard of the first and second land portions, said first and second land portions being spaced from each other a distance greater than the distance between the waste ports, whereby in the neutral position of said valve member the first and second compartments are in communication with the first and second waste ports respectively, a first outlet port in said body wall communicating with said first compartment and a second outlet port in said body wall communicating with said second compartment, said third land portion having an axial dimension less than the axial dimension of the inlet port, said third land portion having a cross section smaller than the cylindrical chamber to define fluid passages with said inlet port to both said compartments, said third land portion and said inlet port having wall means disposed relative to each other in said first operating position to define a fluid passage from said inlet port to said first compartment and to obstruct fluid communication to said second compartment, and said third land portion and said inlet port having wall means disposed relative to each other in said second operating position to define fluid passage to said second compartment and to obstruct fluid communication to said first compartment, said housing having threaded end portions, end caps threadedly engaging said threaded end portions and adapted to engage said sleeve body to thus effect longitudinal adjustment of said sleeve body relative to said housing.

4. A fluid pressure directing valve comprising a hollow housing with a sleeve body reciprocable therein, said sleeve body having a cylindrical wall defining a chamber therein, an inlet port in said sleeve body wall to direct fluid into said chamber, a first waste port in said sleeve body wall spaced in a first direction from said inlet port, a second waste port in said sleeve body wall spaced in a second direction from the said inlet port, a valve member in said chamber reciprocably movable from a neutral position to a first and second operating position, said valve member having a first cylindrical land portion at one end thereof having a cross section smaller than the cylindrical chamber to provide a bleed passageway therebetween, a second cylindrical land portion at the other end thereof having a cross section smaller than the cylindrical chamber to provide a bleed passageway therebetween, and a third cylindrical land portion intermediate said first and second land portions, said first and third land portions in combination with the body wall defining a first compartment and said second and third land portions in combination with the body wall defining a second compartment, said first and second land portions having an axial dimension less than the waste ports to permit fluid communication between the waste ports and the portions of the cylindrical chamber outboard of the first and second land portions, said first and second land portions being spaced from each other a distance greater than the distance between the waste ports, whereby in the neutral position of said valve member the first and second compartments are in communication with the first and second waste ports respectively, a first outlet port in said body wall communicating with said first compartment and a second outlet in said body wall communicating with said second compartment, said third land portion having an annular surface the width of which is less than the diameter of said inlet port, said annular surface and said inlet port in said neutral position defining fluid passages to both said compartments, said third land portion and said inlet port having wall means disposed relative to each other in said first operating position to define a fluid passage to said first compartment and to obstruct fluid communication to said second compartment, and said third land portion and said inlet port having wall means disposed relative to each other in said second operating position to define a fluid passage to said second compartment and to obstruct fluid communication to said first compartment, said housing having threaded end portions, end caps threadedly engaging said threaded end portions and adapted to engage said sleeve body to thus effect longitudinal adjustment of said sleeve body relative to said housing.

CLARENCE JOHNSON.

REFERENCES CITED

The following references are of record in the file of this patent:

UNITED STATES PATENTS

| Number | Name | Date |
|---|---|---|
| 1,937,077 | West | Nov. 28, 1933 |
| 2,000,805 | West | May 7, 1935 |
| 2,040,990 | Haas | May 19, 1936 |
| 2,185,277 | Stelzer | Jan. 2, 1940 |
| 2,209,418 | Overbeke | July 30, 1940 |
| 2,321,000 | Bennett | June 8, 1943 |
| 2,380,705 | Proctor | July 21, 1945 |
| 2,424,901 | Richolt | July 29, 1946 |

FOREIGN PATENTS

| Number | Country | Date |
|---|---|---|
| 627,143 | France | May 30, 1927 |